Feb. 19, 1929.
W. H. HUNGERFORD
1,702,901
BISCUIT FACING AND STACKING MACHINE
Filed Oct. 8, 1923 2 Sheets-Sheet 1
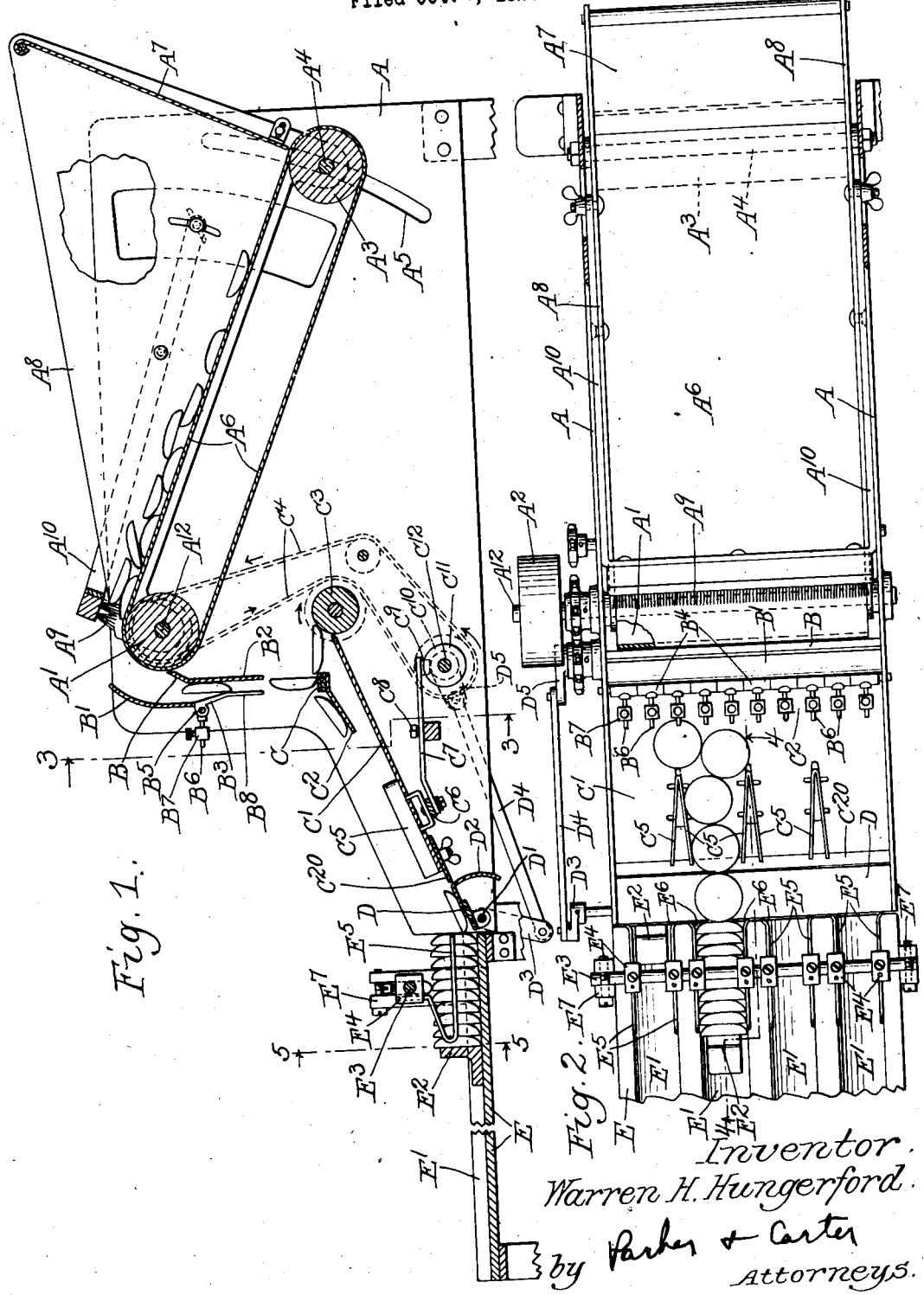
Inventor
Warren H. Hungerford
by Parker & Carter
Attorneys.

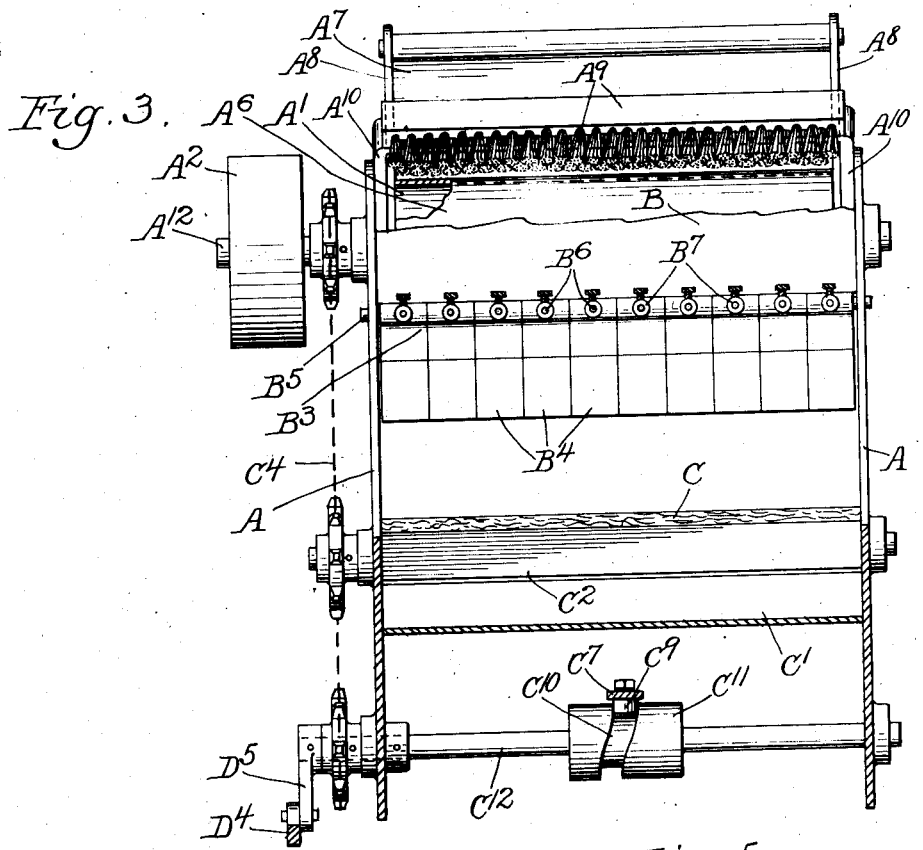
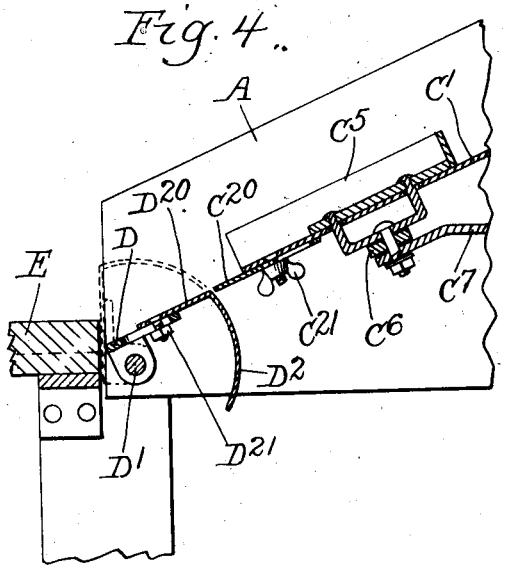
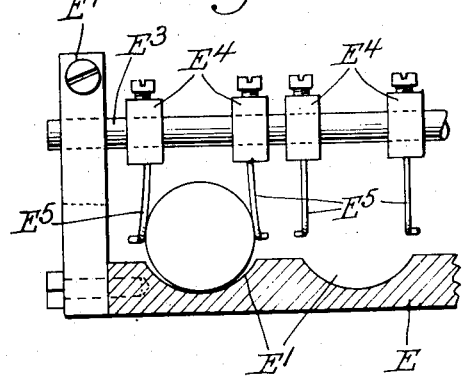

Patented Feb. 19, 1929.

1,702,901

UNITED STATES PATENT OFFICE.

WARREN H. HUNGERFORD, OF CHICAGO, ILLINOIS.

BISCUIT FACING AND STACKING MACHINE.

Application filed October 8, 1923. Serial No. 667,187.

My invention relates to improvements in a machine for facing and stacking biscuits, crackers, cookies and similar articles. It has for one object to provide a new and improved means for facing all the articles handled with the same side of each object facing in the same direction. Another object is to provide means for stacking the faced articles so that they can be conveniently placed in boxes or further treated in manufacture. Other objects will appear from time to time in the course of the specification and claims.

The invention is described as applied to a machine for facing and stacking biscuits or cookies, but is not limited to such use. The facing and stacking machine may take the form of a separate unit or it may form part of other baking, handling, icing and packing machinery. The articles to be faced and stacked may be fed to the machine automatically or by hand and may be discharged from it automatically or by hand, as the case may be. The invention is illustrated more or less diagrammatically in the accompanynig drawings, wherein:

Figure 1 is a vertical section through the entire machine;

Figure 2 is a plan view of the machine;

Figure 3 is a section along line 3—3 of Figure 1;

Figure 4 is an enlarged section along the line 4—4 of Figure 2; and

Figure 5 is an enlarged section along the line 5—5 of Figure 1.

Like parts are illustrated by like characters throughout the specification and drawings.

A, A represent any suitable parallel frame and supporting members. Rotatably mounted on these members is the feed roller $A^1$ which is driven from any suitable power source not herein shown, through the pulley $A^2$ on the shaft $A^{12}$. $A^3$ is a roller mounted on a shaft $A^4$ which is adjustable on the frame members A, A, about an arc of which the axis of the roller $A^1$ is the center. The roller may, for example, be mounted on the hopper side members $A^8$ adjustable along the arcuate slots $A^5$ in the side frame members A. $A^6$ is a belt conveyor adapted to travel about the rollers $A^1$ and $A^3$ and to be driven by the roller $A^1$. It forms, in effect, the bottom of a hopper, the sides of which are formed by the adjustable gate member $A^7$ and the side members $A^8$, which may be adjusted as a unit to conform to the adjustment of the roller $A^3$. It will be understood that the ends of the members $A^8$ always lie below and along the sides of the working surface of a belt conveyor and that the end member $A^8$ closely approaches the roller $A^3$ leaving just sufficient room for the belt conveyor $A^6$ to pass therebetween. $A^9$ is a brush supported on adjustable brackets $A^{10}$ and arranged with sufficient clearance above the roller $A^1$ and the belt conveyor $A^6$ to permit only a single layer of biscuits to pass out between the brush and the roller.

B is a guide chute or apron mounted in any suitable manner upon the main frame and having just sufficient clearance at its upper end between it and the roller $A^1$ to permit the passage of the belt conveyor $A^6$. It receives the biscuits fed by the belt conveyor beneath the brush and guides them downwardly along an inclined path away from the roller $A^1$. $B^1$ is a conveyor plate in line with and spaced slightly from the chute or apron B. Depending downwardly from the lower edges of the members B and $B^1$ are the opposed vertical guide walls $B^2$, $B^3$. The guide wall $B^2$ is rigidly connected to and contacts the chute or apron B. The opposed guide wall $B^3$ consists of a series of separate flexible members $B^4$, each separately pivoted upon a transverse shaft $B^5$ mounted along the lower edge of the conveyor plate $B^1$. The members $B^4$ are held in parallelism with the wall $B^2$ by levers $B^6$ upon which are placed adjustable weights $B^7$. These flexible members $B^4$ are composed of two sections, an upper inclined section, and a lower vertical section $B^8$. The lower section is thus parallel with the opposed wall $B^2$. The members $B^4$ are so positioned with respect to the opposed wall $B^2$ that the thinnest biscuit or other object to be treated will just pass between the two. The thicker biscuits will press the two sides of the chute or guide passage apart but no matter how thick, the biscuits will always be compelled to slide along the fixed vertical wall $B^2$.

Aligned beneath the chute formed by the wall $B^2$ and the opposed members $B^4$ is a transverse longitudinal stop bar C which may be of any suitable material, but is preferably of felt or some similar somewhat yielding material. Disposed beneath the stop bar C is the inclined chute $C^1$, the stop bar being adjacent the upper end of the chute and there being sufficient clearance between them for the passage of the biscuits. Inclined downwardly and forwardly from the stop bar itself is a short supplemental chute $C^2$ which is adapted to discharge biscuits forwardly upon the chute $C^1$. Such biscuits as fall from the rear of the stop bar $C$ are engaged by the roller $C^3$ at the upper end of the chute $C^1$, which is adapted to be driven by the sprocket chain $C^4$ from the shaft $A^{12}$ in a clock-wise direction, as shown in Figure 1. This roller serves to prevent the tilting, jamming and piling up of such of the biscuits as fall to the rear of the stop bar, since the roller draws the biscuits forward until the rear edges of the biscuits clear the rear of the stop bar. $C^5, C^5$ are guide fingers spaced across the chute $C^1$, each guide finger being in effect a narrow wedge. These fingers are given a slight transverse oscillation in relation to the chute $C^1$ by means of the cross piece $C^6$ upon which they are mounted, to which is secured a lever $C^7$ pivoted intermediate its ends as at $C^8$. The opposite end of said lever is provided with a cam roller $C^9$ which penetrates a cam slot $C^{10}$ about the cam cylinder $C^{11}$, which is rotated, for example, by the earlier mentioned chain $C^4$.

At the bottom of the chute $C^1$ is a feeder plate $D$ pivoted as at $D^1$ and having a curved under-cut gate $D^2$. The feeder plate is reciprocated through the lever $D^3$, the link $D^4$ and the crank arm $D^5$ on the cam cylinder shaft $C^{12}$. The arc through which the feeder plate reciprocates is such that each successive biscuit is delivered in vertical position. In order to provide for variations in the size of the articles handled, the lower edge of the chute $C^1$ is provided with an adjustable plate $C^{20}$ and the feeder plate $D$ is provided with an adjusting overlap as at $D^{20}$. The adjustable parts of the two members are controlled respectively by the thumb nut $C^{21}$ and the nut $D^{21}$.

$E$ is a storage plate or block provided with a plurality of longitudinal slots $E^1$ aligned with the spaces between the guide fingers $C^5$. Each successive reciprocation of the feeder plate $D$ feeds a vertically disposed biscuit to the inner end of each of said slots $E^1$. In order to maintain these biscuits in vertical position along said slots, I provide follower blocks $E^2$ adapted to be pushed forward by the successive feed of biscuits thereagainst. As additional means I provide the cross bar $E^5$ upon which are a plurality of collars $E^4$ adjustable therealong, each collar being adapted to support a spring finger $E^5$. The ends of these fingers where the biscuits enter are flared as at $E^6$, to insure proper centering of the biscuits between the fingers. The shaft $E^5$ is also mounted for vertical adjustment on the brackets $E^7$.

It will be realized that while I have an operative device, many changes might be made in the number, size, shape, proportion, relation and disposition of parts without departing from the spirit of my invention, and I wish it to be understood that my invention may be used either separate or as an integral part of other material handling devices, and that I do not limit myself to the specific structure herein shown as an embodiment of my invention.

It will be understood that wherever in the claims the terms biscuits or biscuit handling device are used, that I wish the claims to be interpreted to include any other articles of such size, shape, material and weight as to render their handling practical in the same or similar machines.

The use and operation of my invention are as follows:

In handling and packing biscuits, crackers and the like, it is generally desirable to arrange the biscuits with the same side facing the same direction. Where combination biscuits of two biscuits with a layer of some other material between them are made, it is also necessary to sort the biscuits out before putting them together. Since biscuits are prevailingly made by dropping the batter on a flat surface, they have a flat lower surface and an irregular upper surface, in a small round wafer often approximating a low dome. The greatest width of the biscuit is at its flat bottom edge and it follows that if the biscuit is held in vertical position and dropped a short distance upon a plane surface, it will always fall with the flat side up.

I therefore employ the following general elements, first a feeding conveyor, second a vertical chute down which biscuits are dropped from the conveyor, third a plane surface aligned with the feed chute and fourth, a conveying surface beneath the chute. Biscuits may be dropped helter skelter onto the first conveyor and in fact I illustrate a species of hopper of which this conveyor forms the bottom. To prevent the jamming of the biscuits as they are dropped into the vertical chute, I use a brush which permits the passage of only one layer of biscuits at a time. These biscuits drop in a steady stream upon the plane surfaced stop bar which is made soft in order not to cake or break the biscuits. The biscuits are vertically aligned by the pressure of the weight-pressed wall sections against the opposed vertical wall $B^2$ and drop in vertical position upon the stop bar. If the flat side of the biscuits faces the flat wall, the biscuits very naturally fall forward to the left, as shown in Figure 1. If the bulging sides face the vertical wall, they equally naturally fall to the right. In either case, the conveyor below the stop bar delivers a stream of biscuits with their flat sides up. I have illustrated an inclined chute beneath the stop bar, but obviously any other form of fixed or moving conveyer may be used, depending upon the specific problem of the specific machine. The guide fingers $C^5$ serve to align the biscuits passing down the chute into a number of rows in line with the slots of the storage plate. A slight lateral oscillation is given to these fingers to prevent any stoppage owing to jamming of the biscuits, as shown in Figure 2.

As each successive row of biscuits reaches the bottom of the chute, they pass over upon the pivoted feeder plate D and are lifted upwardly and forwardly into vertical position and pressed by the feeder plate between the flared ends of the wires or spring fingers E⁵. Each successive reciprocation of the feeder plate D presses an additional biscuit forwardly against the inner end of each row of biscuits along the storage plate and the follower blocks are thus pressed to the rear. The biscuits are kept in vertical position by the opposed wires, and once they are aligned and pass beyond the inner ends of the wires, they are held in vertical position by the follower blocks. The operator can then take them out in suitable groups, or stack and drop them into the boxes, or otherwise suitably dispose of them.

In order to deal with biscuits of varying sizes, the bottom of the chute C¹ and the top of the feeder plate D are both longitudinally adjustable. The wires E⁵ may be vertically adjusted by lifting the cross bar E³ upon which they are mounted. They may be horizontally spaced by adjustment along the bar E³ of the collars E⁴ in which they are mounted.

It is to be noted that the vertical passage or chute is formed with a fixed wall opposed by a number of independently pivoted and weighted sections. Thus biscuits of uneven thickness may pass through at the same time without impairing the alignment of the thinner biscuits.

In addition to the brush A⁹ which regulates the feed of biscuits to the vertical chute, the inclination of the endless conveyor A⁶ limits the biscuit feed. This inclination may be adjusted opposes to the positive conveying movement of the conveyor the tendency of the biscuits to slide in the opposite direction, and the tendency is for but a single layer of biscuits to reach the top. If more than two layers do reach the top, of course the adjustable brush limits their feed.

Whereas I have illustrated an inclined chute or slide beneath the stop C, obviously any other form of conveyor might be substituted, for example, a horizontally disposed endless conveyor. I would be particularly likely to use the latter type in case the biscuits were merely being sorted and were being fed out of the machine herein shown direct to an icing machine rather than to a stacker.

I claim:

1. In a biscuit handling machine, a vertical chute and means for feeding biscuits thereto, a stop element underlying said chute, and a conveying means adapted to receive biscuits falling from said stop element, said chute comprising a fixed vertical wall and a wall yieldingly opposed thereto.

2. In a biscuit handling machine, a vertical chute and means for feeding biscuits thereto, a stop element underlying said chute, and a conveying means adapted to receive biscuits falling from said stop element, said chute comprising a fixed vertical wall and a wall comprising a plurality of separate sections yieldingly opposed thereto.

3. In a biscuit handling machine, a vertical chute and means for feeding biscuits thereto, a stop element underlying said chute and a conveying means adapted to receive biscuits falling from said stop element, said chute comprising a fixed vertical wall and a wall comprising a plurality of separate sections pivoted at their upper ends and yieldingly opposed thereto.

4. In a biscuit handling machine, a vertical chute and means for feeding biscuits thereto, a stop element underlying said chute and a conveying means adapted to receive biscuits falling from said stop element, said chute comprising a fixed vertical wall and a wall comprising a plurality of separate sections pivoted at their upper ends and yieldingly opposed thereto, and means for adjusting the thrust of said sections against the fixed vertical wall.

5. In a biscuit handling machine, a vertical chute and means for feeding biscuits thereto, a stop element underlying said chute and adapted to receive biscuits dropped therefrom, an inclined slide spaced beneath said stop, said stop being positioned adjacent the upper edge of said inclined slide, a roller positioned at the upper edge of said inclined slide, and means for driving it to move its exposed surface in a direction opposed to the inclination of the slide, the distance between the stop and the roller being less than the width of the biscuits being handled.

6. The process of facing articles in which the point of support, when they are positioned on edge, lies to one side of the center of the mass of the article, which consists in constraining said articles to downward travel along a vertical path and plane, in dropping them in substantially vertical position on a substantially horizontal surface, and in conveying away the articles successively as they fall from said horizontal surface, with the same side of each article facing the same direction.

7. In an apparatus for facing articles in which the point of support, when they are on edge, lies to one side of the center of mass of the article, means for positioning said articles in a generally vertical plane, and for releasing them, while in such plane, to permit them, in response to gravity, to position themselves upon one face, with the like face of each article facing in the same direction, said positioning and releasing means including a generally vertical chute, and a generally horizontal plane surfaced stop aligned beneath said chute and spaced below it a distance exceeding the diameter of the articles being faced.

8. The method of facing articles in which the point of support, when they are on edge, lies to one side of the center of mass of the article, which consists in constraining said articles to a substantially vertical plane and dropping them substantially vertically while constrained to such plane, upon a substantially plane generally horizontal receiving surface.

Signed at Chicago, county of Cook and State of Illinois, this 2nd day of October, 1923.

WARREN H. HUNGERFORD.